Dec. 27, 1949     D. A. MEEKER     2,492,233
FOOD CHOPPER WITH A PLURALITY OF
CONNECTED FEED PASSAGES

Filed Sept. 24, 1945     2 Sheets-Sheet 1

INVENTOR.
David A. Meeker
BY
Marechal & Biebel
ATTORNEYS

Dec. 27, 1949     D. A. MEEKER     2,492,233
FOOD CHOPPER WITH A PLURALITY OF
CONNECTED FEED PASSAGES

Filed Sept. 24, 1945     2 Sheets-Sheet 2

INVENTOR.
David A. Meeker
BY
Marechal & Biebel
ATTORNEYS

Patented Dec. 27, 1949

2,492,233

UNITED STATES PATENT OFFICE 2,492,233

FOOD CHOPPER WITH A PLURALITY OF CONNECTED FEED PASSAGES

David A. Meeker, Troy, Ohio, assignor to The Hobart Manufacturing Company, Troy, Ohio, a corporation of Ohio Application September 24, 1945, Serial No. 618,075

5 Claims. (Cl. 146—182)

This invention relates to meat and food choppers.

It is a principal object of the invention to provide a chopper which affords adequate protection against injury to the operator so that in feeding by hand no part of the operator's fingers can be caught by the worm and which at the same time can be freely and rapidly fed by the operator at a high rate and substantially without obstruction.

It is a further object to provide such a chopper construction in which a plurality of feed passages are provided through the inlet from each of which the work material is supplied directly into the feed worm and at different locations with respect thereto to assure the effective and rapid feeding from the plurality of openings.

It is also an object to provide a meat and food chopper having a worm and a cylinder and having a plurality of relatively restricted inlet passages for supplying the work material into the worm, such inlet passages being spaced from each other and in correlated relationship with the cylinder and the worm to assure introduction of the work material from each inlet directly into the worm at spaced areas thereof.

It is also an object to provide a meat and food chopper having feeding passages that are joined to each other to form a continuous inlet passage open throughout its length so that the work material may be fed smoothly and rapidly to the worm, the inlet being so contoured and arranged that it is not possible for the operator to be injured by contact with the worm.

It is also an object to provide such a protective chopper in which the feeding inlet is free of grids, cross arms, baffle plates or other obstructions throughout their length assuring the free feeding of the work material on both first and subsequent cuttings, and avoiding the tendency of particles of the work material to collect upon such obstructions.

It is also an object to provide a chopper cylinder in which the feeding may be accomplished by either the fingers of the operator or a pusher with practically the same freedom and speed as with a completely open cylinder, but which is adequately protective so that the operators' fingers are maintained free of dangerous contact with the worm.

It is still further object to provide such a chopper, in which the protective feature is built into the machine and is not afforded by auxiliary devices the removal of which defeats the purpose, which can be manufactured readily and at low cost, and which may be easily kept in a clean and sanitary condition by the user.

Other objects and advantages will be apparent from the following description, the accompanying drawings, and the appended claims.

In the drawings, which illustrate a preferred embodiment of the invention:

Figure 1:
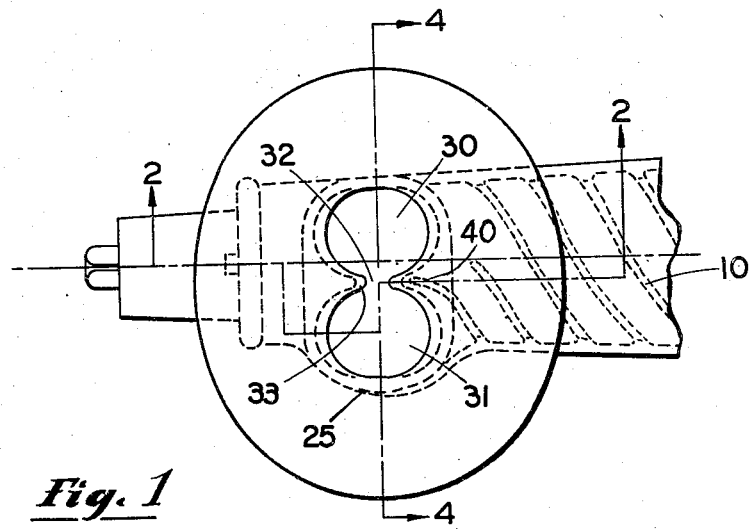
Fig. 1 shows a plan view of a chopper constructed in accordance with the present invention.

Numerous attempts have been made to provide protection for food and meat choppers in order to prevent the possibility of the fingers of the operator from coming into dangerous contact with the feed worm, such conditions in the past having led to serious and distressing accidents where the chopper cylinder was being fed by hand. It has not been practicable heretofore to provide the desired protection while at the same time maintaining the feeding of the chopper free and unrestricted, particularly with respect to choppers of larger size and capacity, and such restrictions and the resulting slower feeding conditions heretofore encountered have to some extent lessened the commercial desirability of protective type choppers. For example, with respect to the provision of protective grids or the like overlying the feeding opening, such devices having usually been found to reduce the normal feeding capacity, and to form obstructions upon which particles of the work material collect, and from which it is necessary to remove them, in the course of the feeding operation. This is particularly objectionable in the feeding of meat subsequent to the initial cutting operation, on second and third cutting, where there is a marked tendency for the meat particles to collect upon any projections, and thus the free and normal passage into the chopper cylinder is interrupted. A similarly objectionable condition exists with the use of baffles or the like to form deflected feeding paths, such devices interfering with the application of the desired pressure, reducing the feeding rate and serving to collect food particles which are often difficult to remove.

In accordance with the present invention a construction of chopper is provided which is adequately protective so that it may be fed rapidly and easily by the hand of the operator, with assurance that the fingers of the operator cannot be extended into dangerous contact with the worm. Feeding by mechanical pushers or the like is also possible, but the operation is not restricted to the use of such pushers, the more rapid manual feed desired by some users being available under adequately protective conditions. In addition this construction provides for substantially unrestricted feeding even in the larger chopper sizes, into which the work material may be fed without the presence of grids or other obstructions upon which the feed material can collect and which thus involve difficulties with respect to cleaning and sanitation. With the construction of the present invention the passage of the work material for both first and subsequent cuttings is rendered rapid, free, and substantially unobstructed, the material being supplied in distributed relation into the worm so that a rapid and effective cutting action is secured.

Still further, the construction is one which is relatively simple and inexpensive to manufacture, contains no moving or removable parts the position of which can be changed to defeat the purpose of the construction, and is further of such character that it may be easily maintained in a clean and sanitary condition at all times.

Referring to the drawings, the chopper cylinder is shown generally at 10 and is of the usual cylindrical shape, its diameter increasing somewhat toward the discharge end. A removable end ring 12 is removably mounted on the end of the cylinder to retain the plate and knives, this construction being of the usual type. The worm is shown at 14 having a spiral feeding flute 15 thereon, the end of the worm shaft 16 extending through the tapered bearing portion 17 to provide the usual detachable driving connection for mounting the cylinder upon a suitable power source. The interior of the cylinder 10 is formed with multiple spiral flutes 18, the lead of which is in the opposite direction to that of the flutes 15 on the feed worm.

Figure 2:
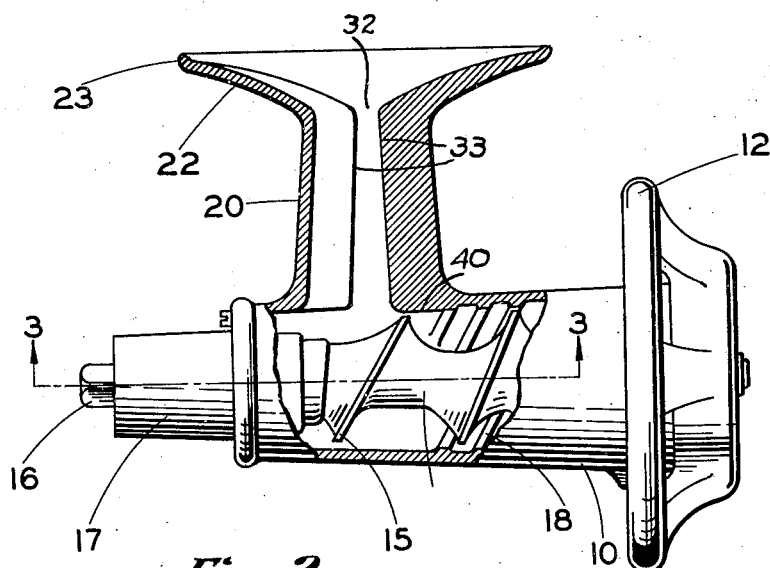
Fig. 2 is a view partially in elevation and partially in section on the broken line 2—2 of Fig. 1.

A neck 20 is formed on the cylinder, preferably being cast integrally therewith, the neck extending upwardly a predetermined distance, as indicated in Fig. 2. At its upper end the neck is belled out to form a flange 22, terminating in a peripheral bead 23. Preferably the flange is substantially oval in shape as shown in Fig. 1, and of a size corresponding to the usual bell mouth type of chopper, in order that the present cylinder may be used in conjunction with existing platter devices now commonly available on which the work material is stacked prior to being fed into the chopper.

Figure 3:
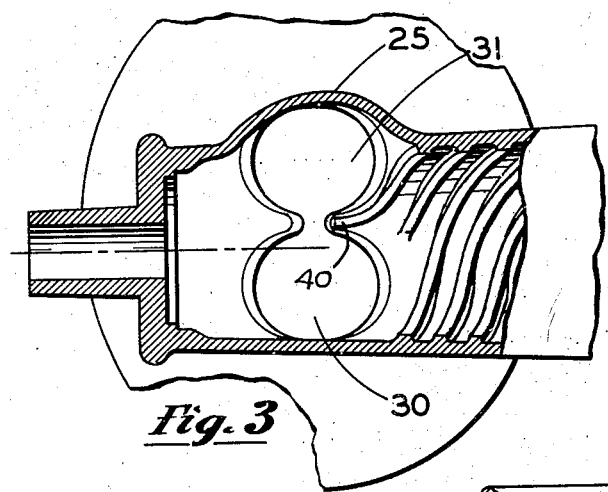
Fig. 3 is an inverted horizontal section looking upwardly toward the inner wall of the cylinder and the inlet passages on the line 3—3 of Fig. 2.
Figure 4:
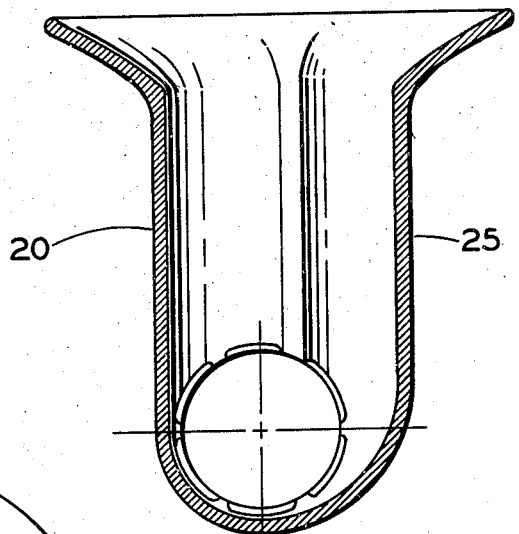
Fig. 4 is a transverse vertical section through the inlet of the chopper on the line 4—4 of Fig. 1.

The neck 20 is formed with a laterally extending enlargement 25 at one side of the cylinder, such enlargement extending beyond the lateral wall of the cylinder as shown in Figs. 1 and 3. This enlargement is at the downwardly turning side of the worm, as indicated in Fig. 4, affording an improved feeding action of the work material into the working space between the flutes of the worm and the flutes of the cylinder.

The inlet for supplying the work material downwardly into the worm is composed of a plurality of feed or inlet passages 30 and 31 extending a predetermined distance above the worm. These passages are preferably arranged generally transversely of the axis of the worm and are located approximately centrally between one side wall of the neck 20, and the opposite side wall of the enlargement 25. As will be evident, therefore, they are offset transversely with respect to the central longitudinal axis of the worm and cylinder. The passage 30 is rearwardly located and passage 31 is forwardly located with respect to the direction of rotation of the worm.

Each feeding passage at its upper end is formed with an opening of predetermined restricted size and shape, the openings being generally arcuate in cross section. As shown in Figs. 1 and 3, the openings may be elliptical, the diameter lengthwise of the worm being slightly larger than the diameter crosswise thereof.

The two passages are joined at their adjacent sides by a relatively much narrower neck or passage 32 so that in section the two main passages and the neck form substantially a figure eight arrangement. The neck 32 is defined by smooth-faced opposed ribs 33 perferably formed integrally with the neck, and having sufficient radius of curvature so that they do not present sharp edges and are thus free of cutting action upon the hand of the operator.

As shown in Figs. 2 and 4 the walls 20 and 25 defining the outer side walls of passages 30 and 31 respectively, extend downwardly in a substantially vertical direction, while at right angles thereto the walls defining both passages 30 and 31, and also the neck portion 32, are flared downwardly and outwardly to provide relief in the direction of feed and to further prevent restriction or obstruction in the feeding operation.

It will be clear from the above that there are thus provided a plurality of distinct main passages joined by a narrow connecting neck passage, all the passages being direct and completely open and unobstructed throughout their vertical extent forming a free feeding inlet of relatively large capacity. There is no portion of the feed passage walls which forms a barrier or obstruction or upon which the work material would have a tendency to collect, and even long or stringy particles of the material find a free and direct passage through the inlet and directly into working relation with the worm.

The size of each of the openings 30 and 31 and the spacing of the upper ends thereof from the worm, is preferably restricted so that the greatest width of either opening is insufficient to permit entry of the hand of the operator far enough for his fingers to extend into dangerous contact with the worm. Thus each feed passage alone is fully protective and the operator may feed the work material manually thereinto without fear of injury, his fingers extending into either or both of the passages. Transversely of the passages there is sufficient width to receive the operator's hand, but the narrow neck portion 32 is fully restrictive being of less width than the thickness of the hand or the fingers. While the fingers may be extended into both of passages 30 and 31, this will require that the hand in effect straddle the neck passage since it is too narrow to receive the fingers itself. In such straddle position it is clear that the neck will not allow passage of the hand above the fingers so that the fingers in this position can not extend farther than they do when in only one of the passages. Thus the entire inlet is maintained fully protective and at the same time assures complete freedom of operation for manual feeding as desired. A pusher member may be utilized in either or both passages if desired, the open neck 32 being relatively small so that it does not prevent the development of proper feeding pressure. The passages are sufficiently short that they do not tend to choke or impair the feeding of the work material either on first or second cutting, and the work material may be fed therethrough easily and rapidly into working relation with the worm. The fact that the passages are open along one side is advantageous on second cutting in particular since it tends to avoid creation of a partial vacuum in the removal of a stamper or pusher from a cylindrical passage.

In order to assure rapid and properly supply of the work material from both feed passages into the worm, at least one of the spiral flutes 18 of the cylinder is provided with an enlargement or extension shown at 40 to cause it to extend beyond the ends of the other flutes and directly into the throat of the passage 32, between the two main passages 30 and 31. In this position as shown in Figs. 1 and 3, it partially overlies the projection of the rearward feeding passage 30, and is in proper position to intercept and pick up the work material which is being fed downwardly through such passage. The work material is thus delivered directly from feed passage 30 into the worm in a location circumferentially spaced from the point of delivery of the material from the forward passage 31 to the worm, i. e., the lower side of enlargement 25, so that a more effective and rapid supply of the work material into the worm is secured. Thus the tendency for the work material to crowd from passage 30 into passage 31 without direct travel into the worm, and with the feeding into the worm taking place almost entirely from the latter passage, is effectively avoided.

Figure 5:
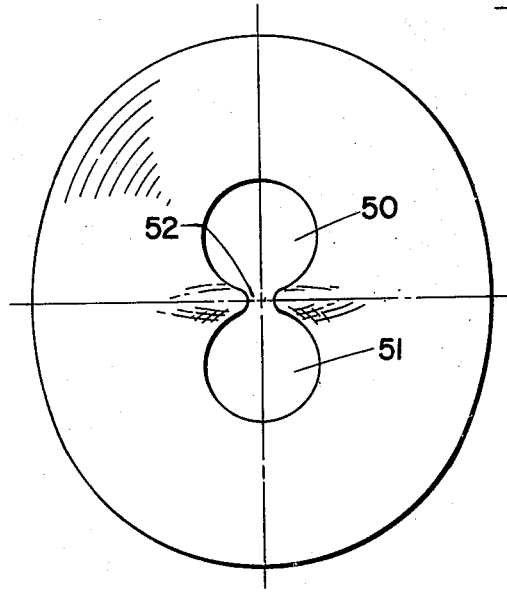
Fig. 5 is a plan view showing a modified construction of inlet.

It is found that proper protection may be secured with the elliptical construction shown in which the diameter of each feed passage lengthwise of the direction of the worm is increased slightly over the diameter crosswise of the worm; if desired however the passage may be the same diameter around its entire periphery, giving a somewhat greater restriction and resulting in a passage which is circular in section. Such a construction is shown in Fig. 5, the circular feed passages 50 and 51 being slightly less open than the elliptical feed passages described above by providing a composite feed passage which has been found to have adequate feeding capacity for normal operation and at conventional worm speeds.

As a specific example, a chopper cylinder of the 32 size has been successfully operated with the following dimensions. The height of the inlet openings 30 and 31 above the top of the worm is approximately 5 to 5⅛ inches, the openings 30 and 31 each being 2⅛ inches in diameter in the shorter direction and 2⅜ inches in diameter at right angles thereto. The neck 32 has a cross dimension at its upper end of approximately ⅝ inches. In the form shown in Fig. 5 the diameter of the upper end of each opening may be 2⅛ inches.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. A food chopper comprising a chopper cylinder adapted to receive a worm therein and having an inlet secured thereto, said inlet being formed to provide a plurality of feed passages extending toward said worm and continuously open and unobstructed throughout their contour, each of said feed passages being relatively restricted in cross-sectional dimensions and of greater length than the maximum cross-sectional dimension such that any one passage alone will admit the fingers of an adult operator only to a point spaced above said worm, said inlet also defining a narrower neck passage opening into each of said feed passages for their entire length and continuously open and unobstructed throughout its contour, said neck passage having a width at its inlet end less than the thickness of the hand of the operator forming with said plurality of feed passages continuously open work receiving passages of predetermined contour allowing entry of the operator's fingers into said feed passages simultaneously while preventing them from coming into contact with said worm.

2. A food chopper as defined in claim 1 in which said passages are of larger cross section closer to the worm providing relief in the feeding of work material thereto.

3. A food chopper as defined in claim 1 in which said cylinder includes means extending in overlying relation with respect to one of said feed passages to intercept the flow of work material therefrom and to effect introduction thereof directly into the worm in circumferentially spaced relation to the introduction of material from the other of said feed passages.

4. A food chopper comprising a chopper cylinder adapted to receive a worm therein and having an inlet secured thereto, said inlet having rearwardly and forwardly located feed passages therethrough opening into the cylinder in circumferentially spaced relation to each other, said feed passages being continuously open and unobstructed from their upper receiving ends to their lower discharge ends adjacent said worm, each of said feed passages being relatively restricted in cross-sectional dimensions and of greater length than the maximum cross-sectional dimension such that either passage alone will admit the fingers of an adult operator only to a point spaced above said worm, said inlet also defining a narrower neck passage opening into both said feed passages for their entire length and continuously open and unobstructed throughout its length, said neck passage having a width at its inlet end less than the thickness of the hand of the operator forming continuously open work receiving passages with the operator's fingers being receivable in both said feed passages simultaneously while prevented from coming in contact with said worm, said forwardly located feed passage including a laterally extending enlargement at one side of said cylinder on the downwardly turning side of said worm providing for introduction of work material thereinto.

5. A food chopper comprising a chopper cylinder adapted to receive a worm therein and having an inlet secured thereto, said inlet having rearwardly and forwardly located feed passages therethrough opening into the cylinder in circumferentially spaced relation to each other, said feed passages being continuously open and unobstructed from their upper receiving ends to their lower discharge ends adjacent said worm, each of said feed passages being relatively restricted in cross-sectional dimensions and of greater length than the maximum cross-sectional dimension such that either passage alone will admit the fingers of an adult operator only to a point spaced above said worm, said inlet also defining a narrower neck passage opening into both said feed passages for their entire length and continuously open and unobstructed throughout its length, said neck passage having a width at its inlet end less than the thickness of the hand of the operator forming continuously open work receiving passages with the operator's fingers being receivable in both said feed passages simultaneously while prevented from coming in contact with said worm, and means on said cylinder extending into overlying relation with said rearward passage for intercepting the flow of work material therefrom and to effect introduction thereof directly into said worm in circumferentially spaced relation to the introduction of material from the other of said passages.

DAVID A. MEEKER.

REFERENCES CITED

The following references are of record in the file of this patent:

UNITED STATES PATENTS

| Number | Name | Date |
| --- | --- | --- |
| 424,758 | Brown, Jr. | Apr. 1, 1890 |
| 693,775 | Beck | Feb. 18, 1902 |
| 1,807,574 | Johnston | May 26, 1931 |
| 1,951,826 | Foster | Mar. 20, 1934 |
| 2,187,252 | Urschel | Jan. 16, 1940 |